US012747384B2

(12) United States Patent
Bhudolia et al.

(10) Patent No.: US 12,747,384 B2
(45) Date of Patent: Sep. 29, 2026

(54) ELASTOMERIC WELLBORE SEAL WITH SILICON-BASED POLYMER

(71) Applicant: Halliburton Energy Services, Inc., Houston, TX (US)

(72) Inventors: Somen Kumar Bhudolia, Singapore (SG); Chad W. Glaesman, Singapore (SG); Sandeep Thatathil, Singapore (SG); Arpana Verma, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/622,373

(22) Filed: Mar. 29, 2024

(65) Prior Publication Data

US 2025/0304848 A1 Oct. 2, 2025

(51) Int. Cl.

*E21B 23/06* (2006.01)
*C09K 8/508* (2006.01)
*E21B 33/12* (2006.01)

(52) U.S. Cl.

CPC ............ *C09K 8/5086* (2013.01); *E21B 23/06* (2013.01); *E21B 33/1208* (2013.01)

(58) Field of Classification Search

CPC .... C09K 8/5086; E21B 23/06; E21B 33/1208
See application file for complete search history.

(56) References Cited

U.S. PATENT DOCUMENTS 11,236,200 B2 2/2022 Arkles et al.
2010/0179266 A1 7/2010 Chorvath et al.
2013/0096038 A1* 4/2013 Kim ........................ C08L 23/16 507/221
2016/0319080 A1* 11/2016 Arkles ................... C08G 77/38
2017/0204695 A1* 7/2017 Bodhayan ............... B29C 73/22
2021/0230965 A1* 7/2021 Zhong .................. C09D 11/102
2022/0049577 A1* 2/2022 Holderman ............. E21B 33/16
2023/0141611 A1 5/2023 Howard et al.
2023/0340854 A1* 10/2023 Fripp ................. E21B 33/1208

OTHER PUBLICATIONS

Goff et al., “Soft Materials with Recoverable Shape Factors from Extreme Distortion States”, Advanced Materials vol. 28, Issue 12, 2016, pp. 2393-2398.
International Patent Application No. PCT/US2024/028289, International Search Report and Written Opinion mailed Dec. 24, 2024, 8 pages.
Arkles et al., “Ultra-high elongation silicone elastomers”, Rubber World, Jun. 2016.
Goff et al., “Soft Materials with Recoverable Shape Factors from Extreme Distortion States”, Adv. Mater., vol. 28, 2016, pp. 2393-2398.
Sulaiman et al., “Mechanical and Physical Properties of Ultra-High Elongation Silicone Elastomers”, Conference Paper presented at the 190th Technical Meeting of Rubber Division, ACS, Pittsburgh, PA, Oct. 11-13, 2016, 12 pages.

* cited by examiner

*Primary Examiner* — Silvana C Runyan
(74) *Attorney, Agent, or Firm* — Kilpatrick Townsend & Stockton LLP

(57) ABSTRACT

An elastomeric material that includes a silicon-based polymer can be positioned in a wellbore to provide fluid control with respect to the wellbore, such as by isolating a well interval of the wellbore. The elastomeric material can be formed using a mixture of a matrix polymer and a hetero-bifunctional siloxane polymer that can be incorporated into the matrix polymer. The elastomeric material can be positioned in a wellbore tool to form a seal in the wellbore.

15 Claims, 5 Drawing Sheets

ELASTOMERIC WELLBORE SEAL WITH SILICON-BASED POLYMER

TECHNICAL FIELD

The present disclosure relates generally to wellbore operations and, more particularly (although not necessarily exclusively), to an elastomeric wellbore seal including a silicon-based polymer for fluid control.

BACKGROUND

Wellbore operations may include various equipment, components, methods, or techniques to perform various tasks with respect to a wellbore, such as fluid control. In some examples, the wellbore operations may involve operating one or more wellbore tools to perform the wellbore operations. Fluid control of a wellbore is commonly accomplished using expandable seals positioned on the wellbore tools. The expandable seals can employ flexible, elastomeric elements that expand. Expanding the expandable seals can involve squeezing the elastomeric elements between two plates.

DETAILED DESCRIPTION

Figure 1:
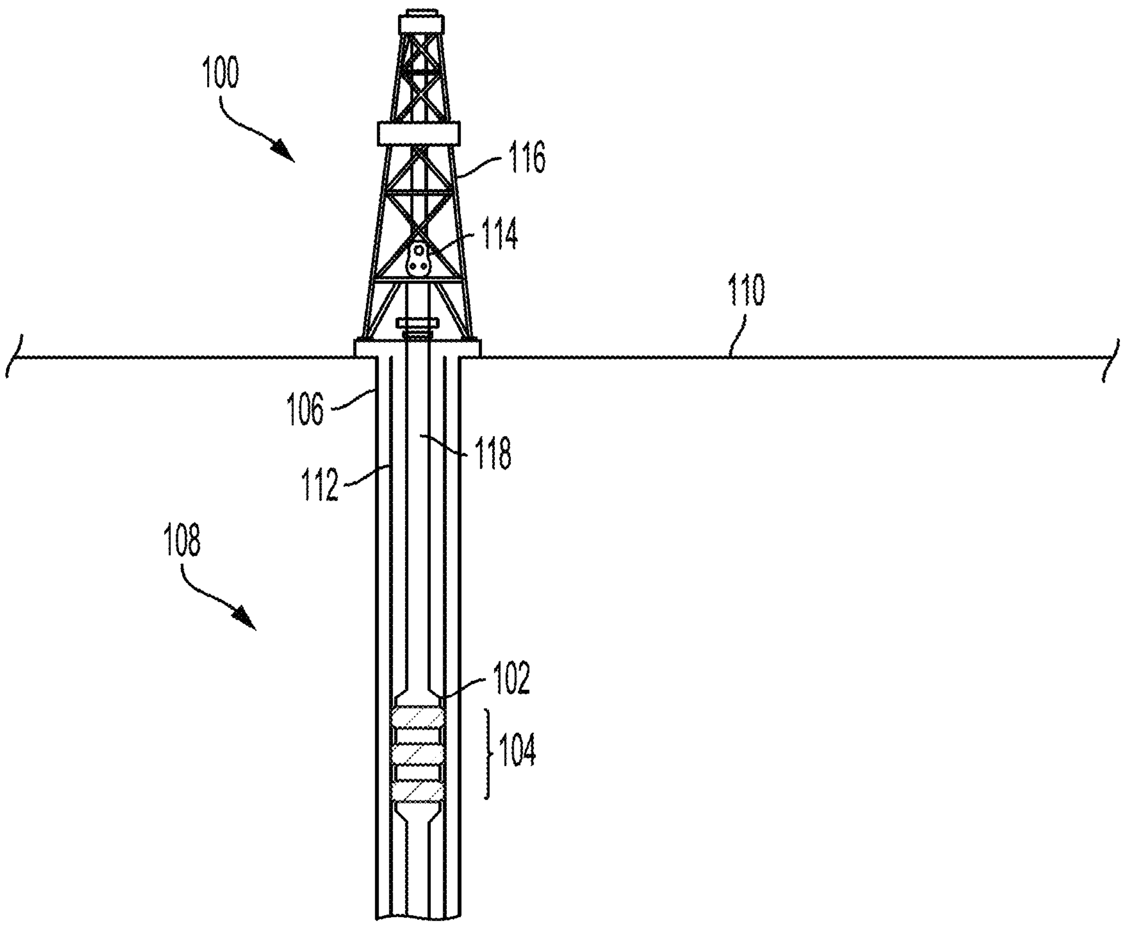
FIG. 1 is a schematic diagram of a wellsite with a wellbore tool including elastomeric elements including a heterobifunctional siloxane polymer according to some aspects of the present disclosure.

Certain aspects and examples of the present disclosure relate to an elastomeric wellbore seal including a silicon-based polymer such as a heterobifunctional siloxane polymer. The elastomeric wellbore seal can be formed using an elastomeric element that can be positioned downhole in a wellbore to form the elastomeric wellbore seal to isolate a portion of the wellbore from a remaining portion of the wellbore. Examples of the elastomeric element can include molded seals, bonded seals, O-rings, packer elements, or other suitable elastomeric components. Adding the heterobifunctional siloxane polymer to a matrix polymer can form a modified elastomeric material used to fabricate the elastomeric element. The matrix polymer can also be referred to as a base polymer. Examples of the matrix polymer can include nitrile butadiene rubbers, hydrogenated nitrile butadiene rubbers, fluorocarbon-based fluoroelastomers, ethylene propylene diene monomer rubbers, tetrafluoroethylene propylene, perfluoroelastomers, or any combination thereof. The heterobifunctional siloxane polymer can include multiple units of siloxane monomers that have different terminating groups on opposite ends of the siloxane monomers. Examples of the terminating groups can include a vinyl group or a hydride group. The modified elastomeric element prepared using the modified elastomeric material can maintain suitable elongation at elevated temperatures associated with a downhole environment while having suitable mechanical properties and chemical resistance for the downhole environment.

The downhole environment of a wellbore can include adverse conditions, such as high temperatures and pressures, that can result in a degradation of material properties. In some cases, the elevated temperatures can include temperatures above 150° C. (302° F.), such as from 160° C. (320° F.) to 200° C. (392° F.). For example, conventional elastomeric seal materials can experience strain capacity losses due to thermal effects. In other words, at elevated temperatures, the conventional elastomeric seal materials may have a relatively low strain capacity such as limited elongation to break. To maintain suitable elongation at the elevated temperatures of the wellbore, the elastomeric material can include the heterobifunctional siloxane polymer that has an elongation of from 500% to 10,000% at the elevated temperatures. Adding the heterobifunctional siloxane polymer to the matrix polymer to form the elastomeric material can augment the elongation of the matrix polymer. Consequently, an overall elongation of the elastomeric material can be greater than the elongation properties of the matrix polymer. The elongation of the elastomeric material can facilitate sealing relatively large radial gaps between a tool string and a casing string deployed in the wellbore. Additionally or alternatively, material properties of the elastomeric material resulting from combining the heterobifunctional siloxane polymer and the matrix polymer can facilitate a reduction in a setting force to set a packer or other suitable tool.

Downhole sealing systems used in a production process in oil and gas applications can be subject to high pressure and temperature scenarios. In some applications, conventional sealing materials may not meet a minimum elongation requirement, especially at elevated temperatures. In addition to meeting the minimum elongation requirement at elevated temperatures, the elastomeric material described herein may provide other mechanical properties or chemical properties to be suitable for use in the downhole sealing systems. For example, the elastomeric material can withstand downhole pressures and temperatures while being resistant to chemicals and gases present in the downhole environment.

The heterobifunctional siloxane polymer described herein can function as a modifier to the matrix polymer to achieve elongation properties that are infeasible with conventional elastomeric seal materials. Examples of the matrix polymer can include nitrile butadiene rubbers, hydrogenated nitrile butadiene rubbers, fluorocarbon-based fluoroelastomers, ethylene propylene diene monomer rubbers, tetrafluoroethylene propylene, perfluoroelastomers, polyurethane, or any combination thereof. Adding the heterobifunctional siloxane polymer to the matrix polymer can increase existing elongation properties of the matrix polymer. Additionally, the elastomeric material prepared by combining the heterobifunctional siloxane polymer and the matrix polymer can maintain chemical properties or mechanical properties of the matrix polymer that are suitable for the downhole environment.

In some cases, the heterobifunctional siloxane polymer can approach 5000% elongation, providing at least four times the elongation of conventional elastomeric seal materials. The elongation of the heterobifunctional siloxane polymer can also be referred to as an elongation to break. The elongation properties of the heterobifunctional siloxane polymer can result from a cure mechanism of the heterobifunctional siloxane polymer. Curing the heterobifunctional siloxane polymer to increase molecular weights of linear polymers can involve inter-chain entanglements and intra-chain entanglements, rather than crosslinking associated with conventional elastomeric seal materials. In particular, the cure mechanism can involve step-growth polymerization that can result in linear polymers of relatively high molecular weight without covalent crosslinking. The heterobifunctional siloxane polymer can exhibit pseudo-shape memory behavior with an ability to return to an original shape after being multi-axially distorted. Additionally, the heterobifunctional siloxane polymer can have a relatively high tear resistance and pseudo-self-healing properties to recover from damage or penetration. In other words, the heterobifunctional siloxane polymer can have suitable elastic recovery and resistance to tear propagation failure after distortion or elongation.

Preparing the heterobifunctional siloxane polymer can involve a casting process similar to silicon mold making or liquid injection molding. In some cases, the heterobifunctional siloxane polymer can be prepared by combining two siloxane components with different molecular weights. In some examples, a ratio of the siloxane components can be 100:1 for fabrication. In particular, the siloxane component with a higher molecular weight can be provided in a higher quantity than the siloxane component with a lower molecular weight. The siloxane component with the higher molecular weight can be considered a base resin, while the siloxane component with the lower molecular weight can be considered a crosslinker. In some examples, the siloxane components of the heterobifunctional siloxane polymer can be prepared using ring-opening polymerization. Examples of the ring-opening polymerization can include equilibrium ring-opening polymerization, anionic ring-opening polymerization (AROP), etc. Using a living polymerization method like AROP can result in heterobifunctional polymers, such as alpha-vinyl, omega-hydride terminated siloxanes. The polymers being heterobifunctional can refer to the polymers having a different group at opposite ends of the siloxane, such as a vinyl group and a hydride group for the alpha-vinyl, omega-hydride terminated siloxanes. Additionally, the living polymerization method can result in dimensional stability and decreased extractable volatiles during aging.

Once prepared, the siloxane components can react with each other in a platinum-catalyzed reaction to form the heterobifunctional siloxane polymer. In other words, a platinum catalyst can function as a curing agent to combine the siloxane components of the heterobifunctional siloxane polymer. An example of the platinum catalyst is platinum-divinyltetramethyldisiloxane. The curing agent can also be referred to as a hardener or a hardening agent. Degassing can occur after adding platinum as the catalyst. Curing the heterobifunctional siloxane polymer can involve heating the heterobifunctional siloxane polymer after initiating the platinum-catalyzed reaction for up to 1 hour. For example, a cure time of the heterobifunctional siloxane polymer can be 1 hour at 80° C. (176° F.). As another example, the cure time of the heterobifunctional siloxane polymer can involve heating the heterobifunctional siloxane polymer for less than 30 seconds (e.g., 25 seconds, 20 seconds, etc.) at 170° C. (338° F.).

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic diagram of a wellsite 100 with a wellbore tool 102 including elastomeric elements 104 including a heterobifunctional siloxane polymer, according to some aspects of the present disclosure. As illustrated in FIG. 1, the wellsite 100 includes a wellbore 106 drilled through a subterranean formation 108. The wellbore 106 extends from a well surface 110 into strata of the subterranean formation 108. The strata can include different materials (e.g., rock, soil, oil, water, gas, etc.) and can vary in thickness and shape. In some examples, the wellsite 100 may include more than one wellbore 106. Additionally, the wellbore 106 can be vertical as depicted, deviated, horizontal, or any combination thereof.

The wellbore 106 can be cased, open-hole, or a combination thereof. For example, a casing string 112 can extend from the well surface 110 through the subterranean formation 108. The casing string 112 can be piping implemented to protect or structurally strengthen the wellbore 106. Examples of material used to produce the casing string 112 can include carbon steel, stainless steel, aluminum, or other suitable material. The casing string 112 may provide a conduit through which wellbore fluid (e.g., production fluid, formation fluid, treatment fluid, etc.), can travel from the wellbore 106 to the well surface 110. In some examples, the casing string 112 can be coupled to walls of the wellbore 106 via annular material, such as cement. For example, a cement layer can be positioned or formed between the casing string 112 and the walls of the wellbore 106 to couple the casing string 112 to the wellbore 106. Due to exposure to downhole conditions (e.g., temperature, pressure, corroding agents, etc.), materials in the wellbore 106 may deteriorate over time.

The wellbore 106 additionally can include one or more well tools, such as the wellbore tool 102. In the example shown in FIG. 1, the wellbore tool 102 is positioned in the wellbore 106 by a winch 114 in a derrick 116 positioned above the well surface 110. In other examples, the wellbore tool 102 may be positioned in the wellbore 106 in another manner. The wellbore tool 102 can be coupled to a tubing string 118 to position the wellbore tool 102 in the wellbore 106. The wellbore tool 102 can be advanced into or retracted from the wellbore 106 by manipulating the tubing string 118 using, for example, a guide or the winch 114. In some examples, a wireline or slickline may be used in place of the tubing string 118.

The wellbore tool 102 can include one or more elastomeric elements 104 made of a modified elastomeric material prepared by combining a heterobifunctional siloxane polymer with a matrix polymer. As depicted in FIG. 1, the wellbore tool 102 includes three elastomeric elements 104 positioned in series. The elastomeric material of the elastomeric elements 104 can provide elastomeric properties to enable the elastomeric elements 104 to regain their original shape when a load is removed from the elastomeric elements 104. For example, the modified elastomeric material can exhibit an elongation of from 500% to 2,000% within a temperature range from 20° C. (68° F.) to 200° C. (392° F.). In other words, the elastomeric material can maintain a suitable elongation at ambient temperatures, such as about 20° C. (68° F.), and at elevated temperatures typical of the downhole environment of the wellbore 106, such as from 150° C. (302° F.) to 200° C. (392° F.).

In some examples, the wellbore tool 102 can include the elastomeric elements 104 as part of various drilling equipment, completion equipment, or wellhead equipment to isolate a portion of the wellbore 106 from a remaining portion of the wellbore 106. For example, based on the elastomeric properties of the elastomeric elements 104, the wellbore tool 102 can set the elastomeric elements 104 at a particular location in the wellbore 106 to seal the wellbore 106. Examples of the wellbore tool 102 can include wellhead assemblies, packers, subsurface safety valves, or blowout preventers. In some examples, the elastomeric elements 104 can provide a seal between the tubing string 118 and the casing string 112. In other examples, the elastomeric elements 104 can seal a region between the tubing string 118 and a liner or a wall of the wellbore 106. Setting the elastomeric elements 104 can involve positioning the elastomeric elements 104 after compressing the elastomeric elements 104 from an original shape to a smaller size. Compressing the elastomeric elements 104 can cause the elastomeric elements 104 to expand, thereby forming a seal in a radial region in the wellbore 106, such as between the casing string 112 and the tubing string 118. Additional details regarding setting the elastomeric elements 104 are described below with respect to FIGS. 2A-2B.

Figure 2B:
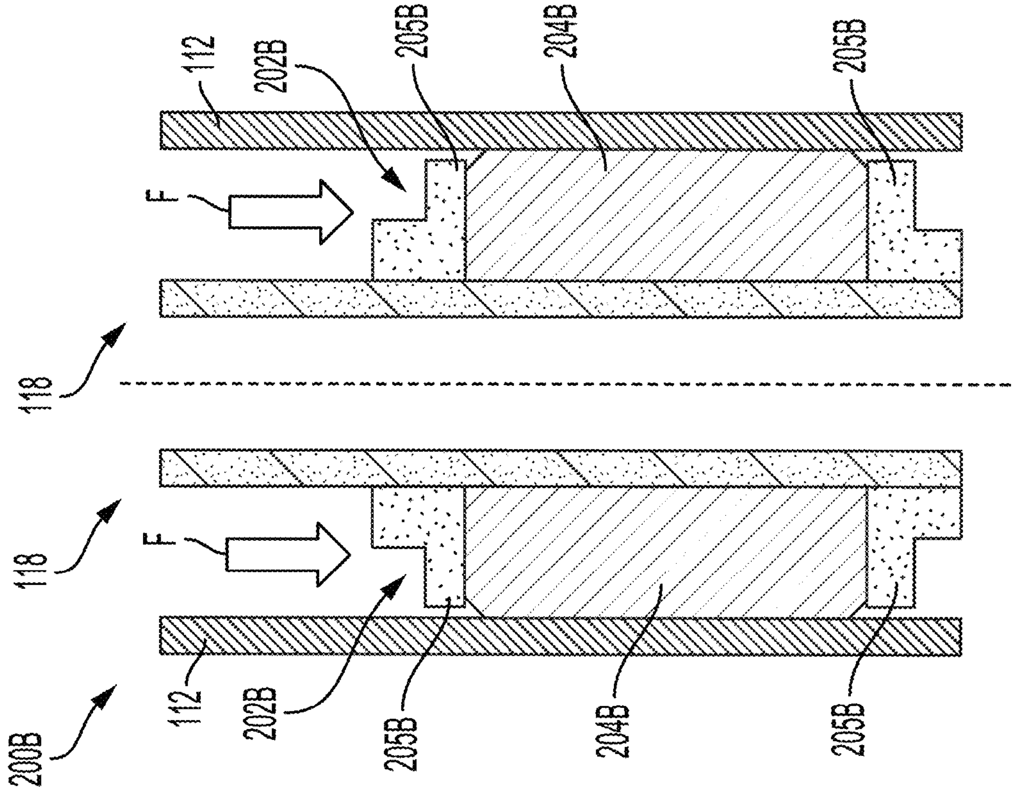
FIG. 2B illustrates a sectional view of a packer including an elastomeric element including a heterobifunctional siloxane polymer after setting the packer in a wellbore according to some aspects of the present disclosure.
Figure 2A:
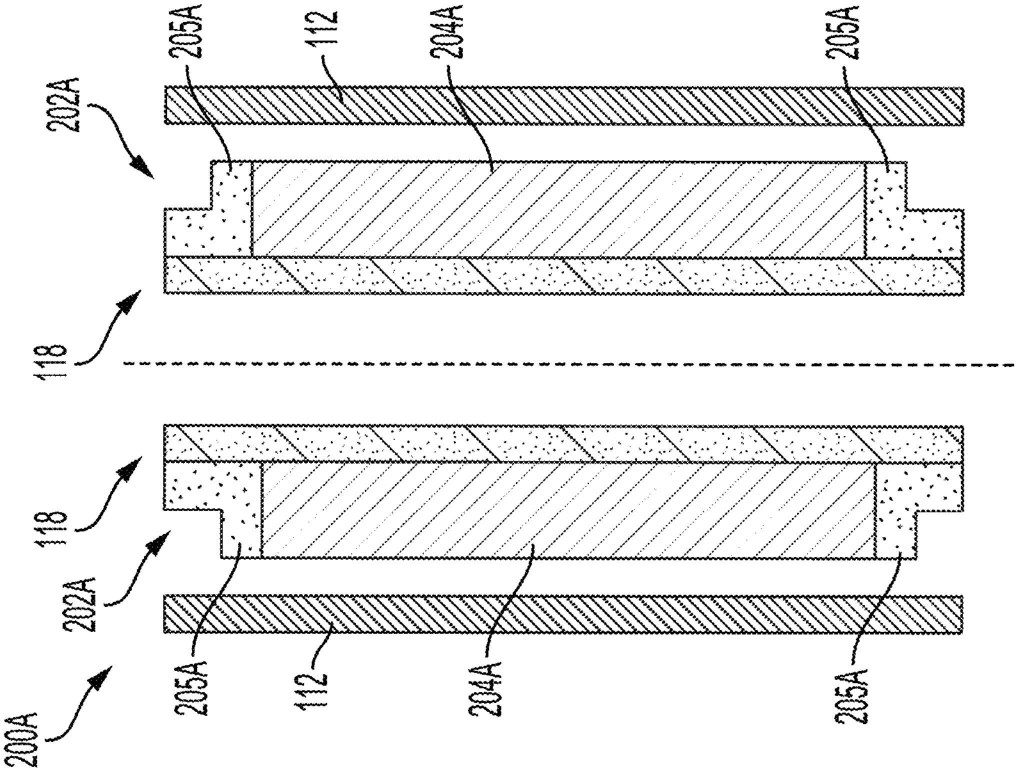
FIG. 2A illustrates a sectional view of a packer including an elastomeric element including a heterobifunctional siloxane polymer before setting the packer in a wellbore according to some aspects of the present disclosure.

FIGS. 2A-2B depict a cross-sectional schematic diagram 200A, 200B of a packer 202A, 202B before and after setting the packer in a wellbore, according to some aspects of the present disclosure. As depicted in FIGS. 2A-2B, the packer 202A, 202B includes an elastomeric element 204 including a heterobifunctional siloxane polymer. The packer 202A, 202B is described below as being part of the wellbore tool 102 of FIG. 1 that is positioned in the wellbore 106 via the tubing string 118. Other configurations are possible. For example, although one elastomeric element 204 is shown in FIGS. 2A-2B, it will be appreciated that more than one elastomeric element may be positioned in the packer 202A, 202B.

As depicted in FIGS. 2A-2B, the packer 202A, 202B can be provided such that the elastomeric element 204 is positioned between a casing string 112 and a tubing string 118 associated with the packer 202A, 202B. FIG. 2A depicts the packer 202A prior to setting the packer 202A in the wellbore such that the elastomeric element 204A is in an original shape that is relatively narrow in width. For example, to facilitate transportation of the packer 202A downhole prior to setting the packer 202A, the elastomeric element 204A may not contact the casing string 112. As depicted in FIG. 2A, the packer 202A can include one or more setting components 205A adjacent to the elastomeric element 204A to position the elastomeric element 204A in the wellbore. In particular, the setting components 205A can be used to set the packer 202A such that the elastomeric element 204A forms a seal in the wellbore.

In some examples, as shown in FIG. 2B, setting the packer 202B can involve applying a compressive force F via the setting components 205B of the packer 202B to the elastomeric element 204B to compress the elastomeric element 204B into a compressed configuration. The compressive force F can also be referred to as a setting force. In some embodiments, the setting components 205B the packer 202B may include at least one tubing weight that can apply the compressive force F to the elastomeric element 204B. In general, the packer 202B can be set mechanically or hydraulically. Examples of mechanical set packers can include tension-set packers that can be set by adding tension on the tubing string 118 and rotation-set packers that can be set by rotating the tubing string 118.

In the compressed configuration, the elastomeric element 204B may have a decreased height and an increased width compared to the original shape of the elastomeric element 204B depicted in FIG. 2A. Due to elastomeric properties of the elastomeric element 204B, the compressive force F can deform the elastomeric element 204B to decrease the height of the elastomeric element 204B while increasing the width of the elastomeric element 204B. As a result of the compressive force F being applied, the elastomeric element 204B can deform to contact the inner wall of the casing string 112. Additionally, continuing to apply the compressive force F can cause the elastomeric element 204B to further expand its width, creating a seal between the inner wall of the casing string 112 and an outer wall of the tubing string 118. For example, the increase in width of the elastomeric element 204B can cause the elastomeric element 204B to press against an inner wall of the casing string 112 such that the elastomeric element 204B prevents fluid flow through the packer 202B.

Including the heterobifunctional siloxane polymer when producing the elastomeric material can enable the elastomeric element 204 to recover from deformation, prevent splitting, or a combination thereof. Due to this elasticity of the elastomeric element 204 provided at least in part by the heterobifunctional siloxane polymer, the elastomeric element 204 can accommodate different casing sizes. The casing sizes can be associated with a respective diameter of different casing strings. As an example, the material properties of the elastomeric element 204 can enable the elastomeric element 204 to suitably expand under the compressive force F to seal casing sizes ranging from 18" to 30" without material failure. Additionally, the elastomeric element 204 can be fabricated to have a relatively small size to pass through downhole constrictions while providing suitable expansion to seal the wellbore. When the packer 202B is to be removed from the wellbore, the compressive force F can be withdrawn from the setting components 205B of the packer 202B. Accordingly, due to the elastic properties of the elastomeric element 204B, the elastomeric element 204B can regain its original shape after deformation when the compressive force F is removed. Accordingly, the elasticity of the elastomeric element 204 can facilitate a removal of the elastomeric element 204 from the wellbore once the compressive force F is removed.

Figure 3:
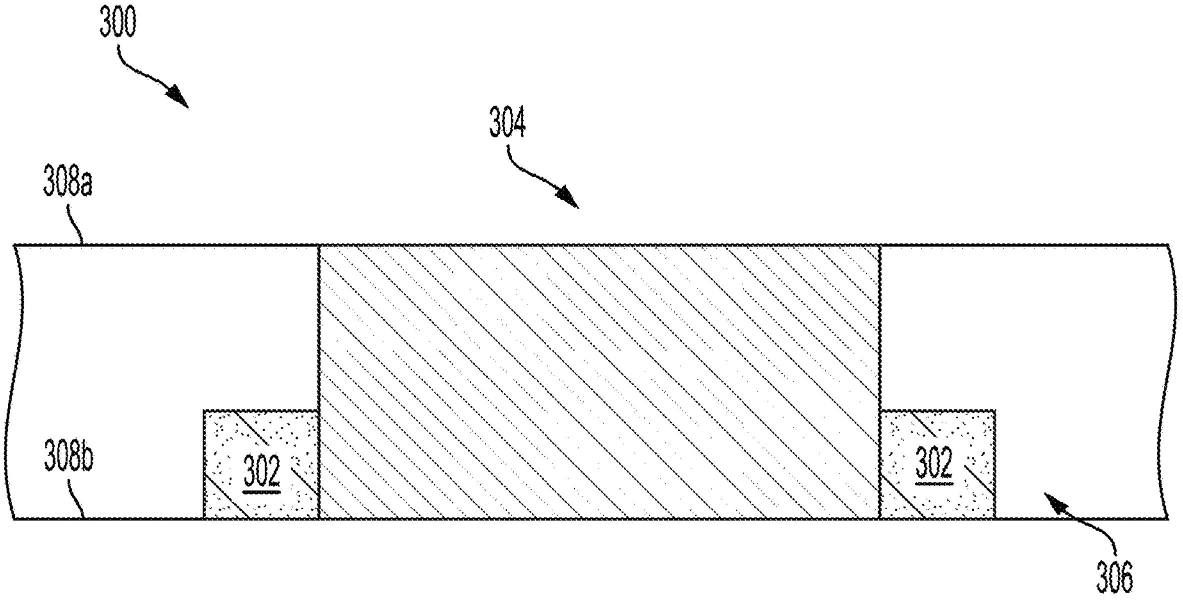
FIG. 3 illustrates a sectional view of a wellbore tool including an elastomeric element including a heterobifunctional siloxane polymer that has expanded to conform to an annulus according to some aspects of the present disclosure.

FIG. 3 illustrates a sectional view 300 of a wellbore tool 302 including an elastomeric element 304 including a heterobifunctional siloxane polymer that has expanded to conform to an annulus 306 according to some aspects of the present disclosure. As illustrated in FIG. 3, the wellbore tool 302 is positioned in an annulus 306 of a wellbore. The annulus 306 can be defined as a space between two concentric objects. In some examples, the annulus 306 may be defined by a wellbore and a casing string, such as the wellbore 106 and the casing string 112 of FIG. 1. In other examples, the annulus 306 can be defined by the casing string and a tubing string, such as the tubing string 118 of FIG. 1. Elastomeric properties of the elastomeric element 304 imparted at least in part by the heterobifunctional siloxane polymer can enable the elastomeric element 304 to expand at both ambient temperatures and elevated temperatures typical of a wellbore, such as temperatures above 150° C. (302° F.)

In some examples, the wellbore tool 302 can be deployed downhole in the wellbore as part of a wellbore operation. During certain wellbore operations, a well zone or a well interval of interest may be isolated from a remainder of the wellbore for various reasons, such as fluid control. The expansion of the elastomeric element 304 can enable the wellbore tool 302 to isolate the well interval of interest by forming a seal in the wellbore. For example, the expanded elastomeric element 304 can press against a first annulus boundary 308*a* and a second annulus boundary 308*b* of the annulus 306 to prevent fluid flow through the wellbore tool 302.

Figure 4:
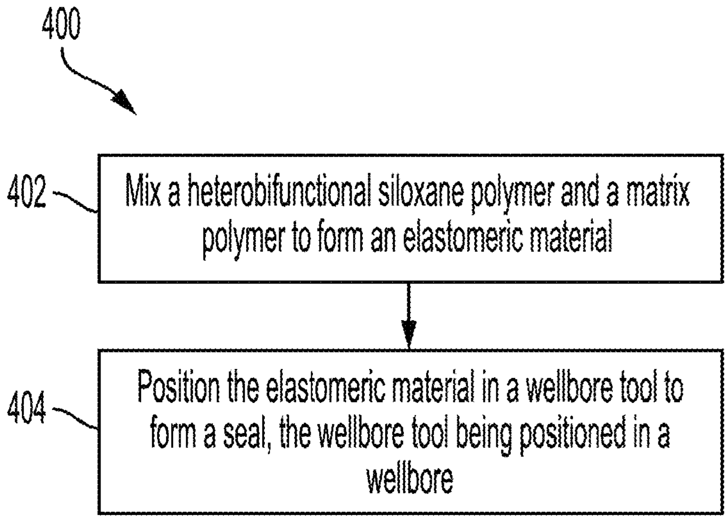
FIG. 4 is a flowchart of a process for preparing an elastomeric material by co-curing a matrix polymer and a heterobifunctional siloxane polymer according to some aspects of the present disclosure.

FIG. 4 is a flowchart of a process 400 for preparing an elastomeric material by co-curing a matrix polymer and a heterobifunctional siloxane polymer, according to some aspects of the present disclosure. As indicated above, in some cases, the matrix polymer can also be referred to as a base elastomer. Other examples can involve more steps, fewer steps, different steps, or a different order of the steps depicted in FIG. 4. The steps of FIG. 4 can be used to produce the elastomeric material of the elastomeric elements described herein, such as the elastomeric elements 104 of FIG. 1, the elastomeric elements 204A-B of FIGS. 2A-2B, or the elastomeric element 304 of FIG. 3. In some examples, the process 400 can involve combining the heterobifunctional siloxane polymer and the matrix polymer as a liquid mixed into a solid matrix that can be hardened into a solid form through co-curing to prepare the elastomeric material.

At block 402, the elastomeric material is formed by mixing the matrix polymer with the heterobifunctional siloxane polymer. In some examples, a mixture including the heterobifunctional siloxane polymer and the matrix polymer can be referred to as a polymer mixture. As an example, the heterobifunctional siloxane polymer may form from approximately 5 wt. % to approximately 30 wt. % of the elastomeric material. For example, the heterobifunctional siloxane polymer can be 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. % of the elastomeric material, or anywhere between. As used herein, "approximately" can mean a range of about 1% larger or smaller, about 2% larger or smaller, about 3% larger or smaller, about 4% larger or smaller, about 5% larger or smaller, or about 10% larger or smaller than the value applied thereto. Although the heterobifunctional siloxane polymer is generally described herein as being cured to fabricate the elastomeric material, in some cases, the heterobifunctional siloxane polymer can be added to the matrix polymer without curing. For example, the heterobifunctional siloxane polymer can be incorporated as a process aid, filler, or viscosity modifier to increase elongation or improve other mechanical properties of the matrix polymer.

In some examples, the matrix polymer may include an elastomer, such as nitrile butadiene rubbers, hydrogenated nitrile butadiene rubbers, fluorocarbon-based fluoroelastomers, ethylene propylene diene monomer rubbers, tetrafluoroethylene propylene, perfluoroelastomers, or any combination thereof. Additionally or alternatively, the matrix polymer may include another suitable polymer, such as an engineering plastic. Examples of the engineering plastic can include polytetrafluoroethylene, polyether ether ketone, polyphenylene sulfide, polyesters, aromatic thermosetting co-polyesters, polyetherketoneketone, or any combination thereof. In some cases, the engineering plastic can be a thermoplastic material that becomes moldable when heated above a predefined temperature and solidifies upon cooling to below the predefined temperature. Additionally, the engineering plastic can have a higher heat resistance than commodity plastics, for example withstanding temperatures up to 260° C. (500° F.).

In some examples, the matrix polymer may include one or more additional components, such as fillers or other suitable compounding components. The additional components may be added to the matrix polymer to impart certain mechanical properties, physical properties, or chemical properties to the elastomeric material. An example of the fillers can include reinforcing fillers, such as carbon black, semi-reinforcing clays, calcium carbonate, precipitated silica, carbon nanotubes, graphene nanotubes, fumed silicas, short fibers, or any combination thereof. The reinforcing fillers can provide a mechanical reinforcing effect to strengthen the elastomeric material with respect to its mechanical properties.

At block 404, the elastomeric material is positioned in a wellbore tool 102 to form a seal. As depicted in FIG. 1, the wellbore tool 102 can be positioned in a wellbore 106. Curing the heterobifunctional siloxane polymer concurrently with or subsequent to curing the matrix polymer in the polymer mixture can be referred to as a co-curing process. Curing the polymer mixture can involve using a first curing agent associated with the heterobifunctional siloxane polymer and a second curing agent associated with the matrix polymer to harden a respective component of the polymer mixture. The first curing agent and the second curing agent is collectively referred to herein as curing agents. The curing agents can also be referred to as hardeners or as hardening agents. In some examples, curing the heterobifunctional siloxane polymer can involve using the first curing agent to combine two siloxane components of the heterobifunctional siloxane polymer. Each siloxane component of the heterobifunctional siloxane polymer can have a different molecular weight. Accordingly, the heterobifunctional siloxane polymer can have different terminating groups on opposite ends of siloxane compounds of the heterobifunctional siloxane polymer. An example of the first curing agent is a platinum catalyst. Examples of the second curing agent can involve peroxide cure systems, sulfur cure systems, sulfur-donor cure systems, bisphenol cure systems, nitrile cure systems, or any combination thereof.

In some examples, such as with respect to the matrix polymer, the curing process can result in crosslinking of polymer chains. In other examples, such as with respect to the heterobifunctional siloxane polymer, the curing process can correspond to a step-growth polymerization that lacks crosslinking. Instead of crosslinking, the first curing agent may cause chain entanglements that result in elastomeric properties. In some examples, the chain entanglements can be formed using step-growth polymerization. The chain entanglements can include intra-chain entanglements of a single chain of the heterobifunctional siloxane polymer and inter-chain entanglements involving multiple chains of the heterobifunctional siloxane polymer. Once formed by curing the components of the polymer mixture, the elastomeric material can be processed to function as a seal in the wellbore 106, for example as the elastomeric elements described above with respect to FIG. 1.

In some examples, curing the polymer mixture can be performed in two stage such that the polymer mixture is prepared in a first stage and the curing agents are added to the polymer mixture in a second stage. Incorporating the curing agents into the polymer mixture can ensure co-curing of the heterobifunctional siloxane polymer and the matrix polymer, resulting in a co-cured polymer blend as the elastomeric material. In other examples, prior to forming the polymer mixture, a heterobifunctional siloxane polymer mixture can be prepared by combining the heterobifunctional siloxane polymer with the second curing agent. Additionally, a matrix polymer mixture can be prepared by combining the matrix polymer and the first curing agent used to harden the heterobifunctional siloxane polymer. After preparing the pre-blended heterobifunctional siloxane polymer, the heterobifunctional siloxane polymer mixture can be combined with the matrix polymer mixture to form the elastomeric material. In this case, the matrix polymer mixture can include the additional components, such as at least one reinforcing filler.

In further examples, the co-curing process can involve a three-stage process. For example, during a first stage, a portion of the matrix polymer can be combined with the heterobifunctional siloxane polymer to form the polymer mixture. Additionally, the additional components, such as additives or fillers, can be included. During a second stage, a remaining portion of the matrix polymer and the curing agents can be combined to form a curing mixture. As an example, if 100 kg of the matrix polymer is being used to form the elastomeric material, 50% (e.g., 50 kg) of the matrix polymer may be used to form the polymer mixture, while the remaining portion (e.g., 50 kg) may be used to form the curing mixture. Other suitable ratios may be used. After preparing the polymer mixture and the curing mixture, the elastomeric material can be formed by combining the polymer mixture and the curing mixture. In some cases, mixing the polymer mixture and the curing mixture can be referred to as a "Y-mix."

Figure 5:
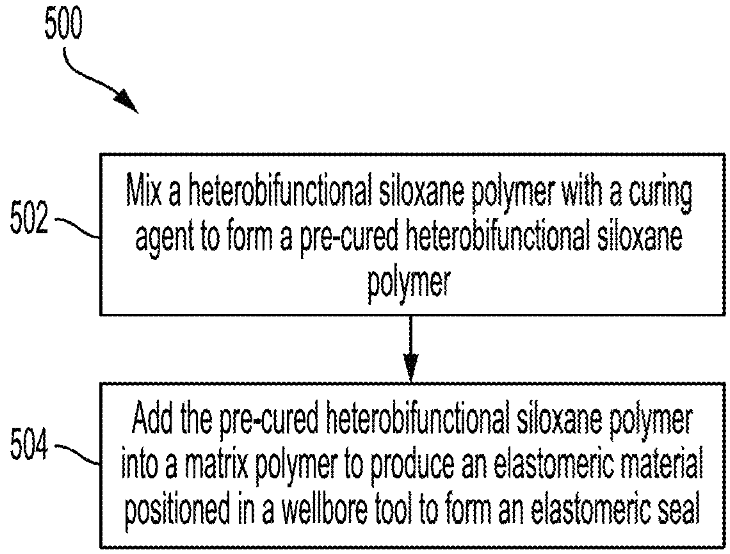
FIG. 5 is a flowchart of a process for preparing an elastomeric material by curing a heterobifunctional siloxane polymer prior to adding the heterobifunctional siloxane polymer to a matrix polymer according to some aspects of the present disclosure.

FIG. 5 is a flowchart of a process 500 for preparing an elastomeric material by curing a heterobifunctional siloxane polymer prior to adding the heterobifunctional siloxane polymer to a matrix polymer, according to some aspects of the present disclosure. Other examples can involve more steps, fewer steps, different steps, or a different order of the steps depicted in FIG. 5. The steps of FIG. 5 can be used to produce the elastomeric material of the elastomeric elements described herein, such as the elastomeric elements 104 of FIG. 1, the elastomeric elements 204A-B of FIGS. 2A-2B, or the elastomeric element 304 of FIG. 3.

At block 502, a pre-cured heterobifunctional siloxane polymer is formed by mixing the heterobifunctional siloxane polymer with a curing agent. In contrast to the co-curing process 400 described above, the process 500 involves a pre-curing process in which the heterobifunctional siloxane polymer is cured prior to combining the heterobifunctional siloxane polymer with the matrix polymer. For example, the heterobifunctional siloxane polymer can be combined with a platinum catalyst as the curing agent to prepare the pre-cured heterobifunctional siloxane polymer. Combining the heterobifunctional siloxane polymer with the curing agent can cause chain entanglements to form, thereby hardening the heterobifunctional siloxane polymer and imparting elastomeric properties.

At block 504, the elastomeric material is produced by adding the pre-cured heterobifunctional siloxane polymer into a matrix polymer. As an example, the heterobifunctional siloxane polymer may form from approximately 5 wt. % to approximately 30 wt. % of the elastomeric material. The elastomeric material can be positioned in a downhole tool (e.g., the wellbore tool 102 of FIG. 1) to form a seal. After combining the heterobifunctional siloxane polymer and the curing agent to prepare the pre-cured heterobifunctional siloxane polymer, the pre-cured heterobifunctional siloxane polymer can be further processed prior to being added to the matrix polymer. In some examples, the pre-cured heterobifunctional siloxane polymer can be processed to have a fine particle size. For example, the fine particle size can be defined as the pre-cured heterobifunctional siloxane polymer having a diameter of 2.5 μm or less. The pre-cured heterobifunctional siloxane polymer then can be added as a solid filler into the polymer mixture to augment elastomeric properties of the polymer mixture while maintaining oil resistance and mechanical properties suitable for a downhole environment. In some examples, the pre-cured heterobifunctional siloxane polymer may be grinded such that the pre-cured heterobifunctional siloxane polymer has a fine particle size. In other examples, a spray system can be used to form the pre-cured heterobifunctional siloxane polymer that has the fine particle size. Additional details regarding the spray system are provided below with respect to FIG. 6.

Figure 6:
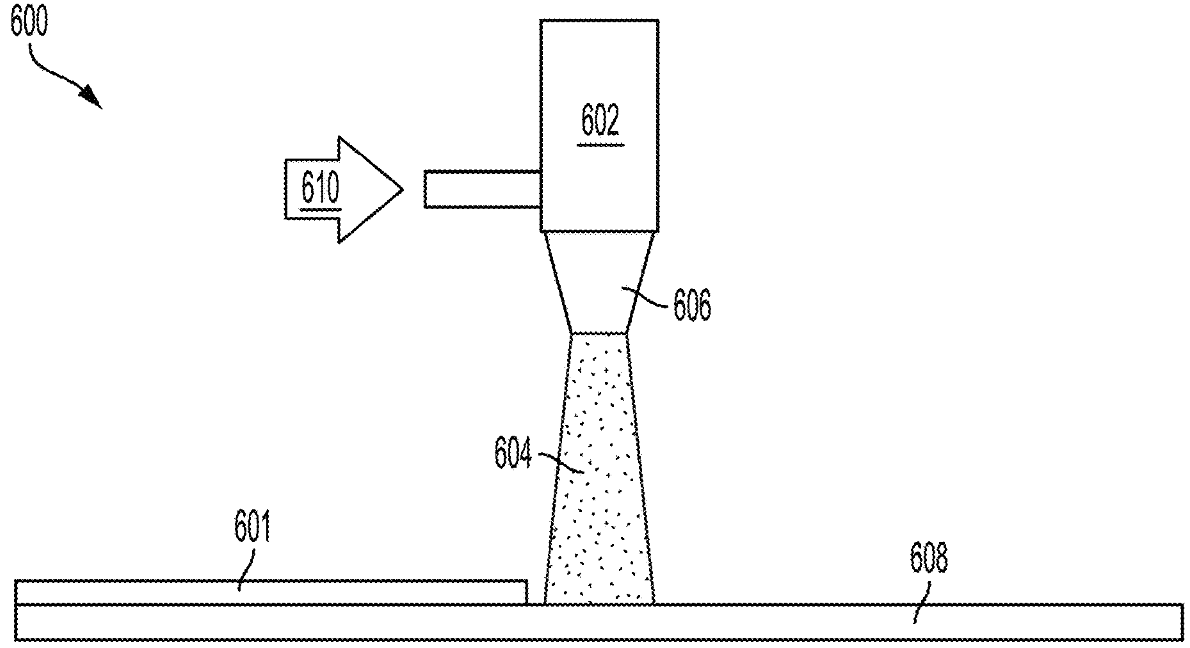
FIG. 6 is a diagram of a spray system used to process a pre-cured heterobifunctional siloxane polymer according to some aspects of the present disclosure.

FIG. 6 is a schematic diagram of a spray system 600 used to process a pre-cured heterobifunctional siloxane polymer 601, according to some aspects of the present disclosure. In some examples, the spray system can be used to implement the process 500 of processing the pre-cured heterobifunctional siloxane polymer 601 described above with respect to FIG. 5. The spray system 600 can include a mixture feeder 602 to receive a spray mixture 604 including the heterobifunctional siloxane polymer and the curing agent and provide the spray mixture 604 to a nozzle 606 for dispersing the spray mixture 604. For example, the spray mixture may include the heterobifunctional siloxane polymer and a platinum catalyst as the curing agent to harden the heterobifunctional siloxane polymer. Although one nozzle 606 is depicted in FIG. 6, it will be appreciated that one or more nozzles may be used to deposit the spray mixture 604.

The mixture feeder 602 can be adjusted to control a rate at which the spray mixture 604 is supplied to the nozzle 606, which can control a rate at which the spray mixture 604 is sprayed onto a heated substrate 608. In some examples, the heated substrate 608 can be a hot plate. In other examples, the heated substrate 608 may be part of a hot air oven. In some examples, the spray system 600 additionally can include a carrier gas 610 added to the mixture feeder 602 to transport the spray mixture 604 onto the heated substrate 608. Examples of carrier gases provided to the mixture feeder 602 can include air, nitrogen, helium, other suitable inert gases, or any combination thereof.

After being sprayed via the nozzle 606 onto the heated substrate 608, the spray mixture 604 can form the pre-cured heterobifunctional siloxane polymer 601 that has a fine particle size, such as having a diameter at or below 2.5 μm. The pre-cured heterobifunctional siloxane polymer can be combined with a matrix polymer as a solid filler to increase elongation properties of the matrix polymer and form the elastomeric material. For example, if the matrix polymer has an elongation between 250% and 300%, incorporating the pre-cured heterobifunctional siloxane polymer can increase the elongation of the resulting elastomeric material to from 500% to 2,000%.

In some aspects, elastomeric materials for wellbore fluid control and methods to prepare the elastomeric materials using a heterobifunctional siloxane polymer are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a mixture comprising: a matrix polymer; and a heterobifunctional siloxane polymer incorporated into the matrix polymer to form a modified elastomeric material positionable in a wellbore tool to form a seal, the wellbore tool positionable in a wellbore.

Example 2 is the mixture of example(s) 1, wherein the matrix polymer is an elastomer selected from a group consisting of nitrile butadiene rubbers, hydrogenated nitrile butadiene rubbers, fluorocarbon-based fluoroelastomers, ethylene propylene diene monomer rubbers, tetrafluoroethylene propylene, perfluoroelastomers, and polyurethane.

Example 3 is the mixture of example(s) 1-2, wherein the modified elastomeric material has an elongation of from 500% to 2,000% within a temperature range from 20° C. to 200° C.

Example 4 is the mixture of example(s) 1-3, wherein the heterobifunctional siloxane polymer comprises from approximately 5 wt. % to approximately 30 wt. % of the modified elastomeric material.

Example 5 is the mixture of example(s) 1-4, wherein the mixture further comprises: a first curing agent to harden the heterobifunctional siloxane polymer by combining two siloxane components; and a second curing agent to harden the matrix polymer.

Example 6 is the mixture of example(s) 1-5, wherein the heterobifunctional siloxane polymer comprises one or more intra-chain entanglements and one or more inter-chain entanglements formed using step-growth polymerization.

Example 7 is the mixture of example(s) 1-6, wherein the matrix polymer is an engineering plastic selected from the group consisting of polytetrafluoroethylene, polyether ether ketone, polyphenylene sulfide, polyesters, aromatic thermosetting co-polyesters, and polyetherketoneketone.

Example 8 is a method comprising: mixing a heterobifunctional siloxane polymer and a matrix polymer to form an elastomeric material; and positioning the elastomeric material in a wellbore tool to form a seal, the wellbore tool positioned in a wellbore.

Example 9 is the method of example(s) 8, wherein mixing the heterobifunctional siloxane polymer and the matrix polymer further comprises: preparing a matrix polymer mixture by mixing the matrix polymer and a first curing agent, wherein the first curing agent is used to harden the heterobifunctional siloxane polymer; preparing a heterobifunctional siloxane polymer mixture by mixing the heterobifunctional siloxane polymer and a second curing agent, wherein the second curing agent is used to harden the matrix polymer; and combining the matrix polymer mixture and the heterobifunctional siloxane polymer mixture to form the elastomeric material.

Example 10 is the method of example(s) 8-9, further comprising: curing a polymer mixture comprising the heterobifunctional siloxane polymer and the matrix polymer to form the elastomeric material by adding a first curing agent and a second curing agent to the polymer mixture to harden the heterobifunctional siloxane polymer and the matrix polymer, respectively.

Example 11 is the method of example(s) 8-10, wherein curing the heterobifunctional siloxane polymer and the matrix polymer further comprises: preparing a curing mixture by mixing the matrix polymer with the first curing agent and the second curing agent, wherein the first curing agent corresponds to the heterobifunctional siloxane polymer and the second curing agent corresponds to the matrix polymer; and forming the elastomeric material by mixing the polymer mixture and the curing mixture to harden the polymer mixture.

Example 12 is the method of example(s) 8-11, wherein forming the elastomeric material further comprises: mixing the heterobifunctional siloxane polymer with a curing agent to form a pre-cured heterobifunctional siloxane polymer; and adding the pre-cured heterobifunctional siloxane polymer into the matrix polymer to produce the elastomeric material.

Example 13 is the method of example(s) 8-12, wherein forming the pre-cured heterobifunctional siloxane polymer further comprises: preparing a spray mixture comprising the heterobifunctional siloxane polymer and the curing agent, wherein the curing agent is used to harden the heterobifunctional siloxane polymer; spraying the spray mixture using one or more nozzles; and heat treating the spray mixture to form the elastomeric material.

Example 14 is the method of example(s) 8-13, wherein the matrix polymer is an elastomer selected from a group consisting of nitrile butadiene rubbers, hydrogenated nitrile butadiene rubbers, fluorocarbon-based fluoroelastomers, ethylene propylene diene monomer rubbers, tetrafluoroethylene propylene, and perfluoroelastomers.

Example 15 is the method of example(s) 8-14, wherein the elastomeric material has an elongation of from 500% to 2,000% within a temperature range from 20° C. to 200° C.

Example 16 is the method of example(s) 8-15, wherein the heterobifunctional siloxane polymer comprises from approximately 5 wt. % to approximately 30 wt. % of the elastomeric material.

Example 17 is the method of example(s) 8-16, wherein the heterobifunctional siloxane polymer comprises one or more intra-chain entanglements and one or more inter-chain entanglements formed using step-growth polymerization.

Example 18 is a wellbore tool comprising: an elastomeric material positionable in the wellbore tool to form a seal in a wellbore, the elastomeric material comprising a heterobifunctional siloxane polymer incorporated into a matrix polymer; and one or more setting components to position the elastomeric material to form the seal in the wellbore.

Example 19 is the wellbore tool of example(s) 18, wherein the matrix polymer is an elastomer selected from a group consisting of nitrile butadiene rubbers, hydrogenated nitrile butadiene rubbers, fluorocarbon-based fluoroelastomers, ethylene propylene diene monomer rubbers, tetrafluoroethylene propylene, and perfluoroelastomers.

Example 20 is the wellbore tool of example(s) 18-19, wherein the elastomeric material has an elongation of from 500% to 2,000% within a temperature range from 20° C. to 200° C.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A mixture comprising:

a polymer mixture comprising:

- a matrix polymer; and
- a heterobifunctional siloxane polymer comprising a set of siloxane monomers, wherein each siloxane monomer of the set of siloxane monomers comprises a first terminating group on a first end and a second terminating group different from the first terminating group on a second end; and a curing mixture combinable with the polymer mixture to incorporate the heterobifunctional siloxane polymer into the matrix polymer to form a modified elastomeric material positionable to form a seal in a wellbore tool that is positionable in a wellbore, the curing mixture comprising:

a set of curing agents to cure the matrix polymer with the heterobifunctional siloxane polymer, wherein a first curing agent of the set of curing agents is combinable with the polymer mixture to form chain entanglements in the set of siloxane monomers and a second curing agent of the set of curing agents is combinable with the polymer mixture to form cross-linking of the matrix polymer.

2. The mixture of claim 1, wherein the matrix polymer is an elastomer selected from a group consisting of nitrile butadiene rubbers, hydrogenated nitrile butadiene rubbers, fluorocarbon-based fluoroelastomers, ethylene propylene diene monomer rubbers, tetrafluoroethylene propylene, perfluoroelastomers, and polyurethane.

3. The mixture of claim 1, wherein the modified elastomeric material has an elongation of from 500% to 2,000% within a temperature range from 20° C. to 200° C.

4. The mixture of claim 1, wherein the heterobifunctional siloxane polymer comprises from 5 wt. % to 30 wt. % of the modified elastomeric material.

5. The mixture of claim 1, wherein the heterobifunctional siloxane polymer comprises one or more intra-chain entanglements and one or more inter-chain entanglements formed by step-growth polymerization.

6. The mixture of claim 1, wherein the matrix polymer is an engineering plastic selected from the group consisting of polytetrafluoroethylene, polyether ether ketone, polyphenylene sulfide, polyesters, aromatic thermosetting co-polyesters, and polyetherketoneketone.

7. The mixture of claim 1, wherein the polymer mixture further comprises the second curing agent.

8. The mixture of claim 1, wherein the polymer mixture further comprises a reinforcing filler selected from a group consisting of: carbon black, semi-reinforcing clays, calcium carbonate, precipitated silica, carbon nanotubes, graphene nanotubes, fumed silicas, and fibers.

9. The mixture of claim 1, wherein the polymer mixture is prepared in a first stage, and wherein the curing mixture is added to the polymer mixture in a second stage.

10. The mixture of claim 1, wherein the curing mixture comprises the matrix polymer.

11. The mixture of claim 1, wherein the matrix polymer is a thermoplastic material.

12. The mixture of claim 1, wherein the matrix polymer has a heat resistance of up to 260° C.

13. The mixture of claim 1, wherein the modified elastomeric material is expandable under compressive force to form the seal.

14. The mixture of claim 1, wherein the wellbore tool is positionable in an annulus of the wellbore.

15. The mixture of claim 1, wherein the set of siloxane monomers comprises a first siloxane monomer and a second siloxane monomer having a different molecular weight than the first siloxane monomer.

* * * * *